United States Patent
Houis et al.

(10) Patent No.: US 8,225,508 B2
(45) Date of Patent: Jul. 24, 2012

(54) PROCESS FOR ASSEMBLING TWO ASSEMBLIES, SUCH AS AIRCRAFT FUSELAGE ASSEMBLIES

(75) Inventors: Jean-Luc Houis, Plesse (FR); Gerard Cohen Bacri, Montoir de Bretagne (FR)

(73) Assignee: Airbus Operations SAS, Toulouse (FR)

( * ) Notice: Subject to any disclaimer, the term of this patent is extended or adjusted under 35 U.S.C. 154(b) by 474 days.

(21) Appl. No.: 12/526,135

(22) PCT Filed: Feb. 15, 2008

(86) PCT No.: PCT/EP2008/051855
§ 371 (c)(1),
(2), (4) Date: Aug. 6, 2009

(87) PCT Pub. No.: WO2008/101873
PCT Pub. Date: Aug. 28, 2008

(65) Prior Publication Data
US 2010/0043194 A1  Feb. 25, 2010

(30) Foreign Application Priority Data
Feb. 16, 2007  (FR) .................................... 07 53303

(51) Int. Cl.
*B21D 53/00* (2006.01)
*B21D 53/92* (2006.01)
*B23P 11/00* (2006.01)

(52) U.S. Cl. .................. 29/897.2; 29/407.09; 29/407.1; 29/525.01; 408/79

(58) Field of Classification Search .............. 29/897.2, 29/407.09, 407.1, 524.1, 525.01, 525.06, 29/525.13; 408/79
See application file for complete search history.

(56) References Cited

U.S. PATENT DOCUMENTS

| | | | | |
|---|---|---|---|---|
| 2,228,779 A * | 1/1941 | Pavlecka et al. | ................ | 52/394 |
| 3,141,509 A * | 7/1964 | Bent | ................ | 173/19 |
| 4,599,018 A * | 7/1986 | Woods | ................ | 408/1 R |
| 5,277,526 A * | 1/1994 | Corsi | ................ | 408/97 |
| 5,628,592 A | 5/1997 | Ringer | | |
| 6,098,260 A * | 8/2000 | Sarh | ................ | 29/243.53 |
| 6,467,385 B1 * | 10/2002 | Buttrick et al. | ................ | 83/745 |
| 6,772,508 B2 * | 8/2004 | Bloch et al. | ................ | 29/709 |
| 6,796,014 B2 * | 9/2004 | Sarh | ................ | 29/407.09 |
| 6,855,099 B2 * | 2/2005 | Hazlehurst et al. | ............. | 483/38 |
| 6,979,288 B2 * | 12/2005 | Hazlehurst et al. | ............... | 483/1 |
| 7,003,860 B2 * | 2/2006 | Bloch et al. | ................ | 29/407.1 |
| 7,214,008 B1 * | 5/2007 | Dods et al. | ................ | 408/115 R |
| 7,509,740 B2 * | 3/2009 | Munk et al. | ................ | 29/897.2 |
| 2004/0117962 A1 * | 6/2004 | Bloch et al. | ................ | 29/407.1 |

FOREIGN PATENT DOCUMENTS

| | | | |
|---|---|---|---|
| DE | 4431952 A1 * | 3/1996 | |
| EP | 0 761 351 | 3/1997 | |
| FR | 2 562 179 | 10/1985 | |

* cited by examiner

*Primary Examiner* — Jermie Cozart
(74) *Attorney, Agent, or Firm* — Oblon, Spivak, McClelland, Maier & Neustadt, L.L.P.

(57) ABSTRACT

A process for assembling two assemblies, for example aircraft fuselage assemblies, using multiple fastening components. The process includes drilling of holes through an overlap zone, carried out using a drilling tool which passes through an associated centering hole made in a drilling grid fixed to this overlap zone, wherein the drilling tool includes a support mandrel and an expanding ring which fits onto the mandrel along a conical contact surface. A relative movement between the expanding ring and the mandrel is applied so that, following immobilization of the ring in the associated centering hole, displacement of the mandrel supported against the overlap zone is produced, through the centering hole and towards this overlap zone, to exert a pressure on the latter.

14 Claims, 10 Drawing Sheets

PROCESS FOR ASSEMBLING TWO ASSEMBLIES, SUCH AS AIRCRAFT FUSELAGE ASSEMBLIES

TECHNICAL FIELD

The present invention relates in general terms to a process for assembling two assemblies, for example by riveting.

The invention applies preferably, but not exclusively, to the assembling of two constituent assemblies of an aircraft fuselage. More precisely, it may involve a so-called seam assembly process, that is to say, assembly by placing a tightened fastening device of the "lockbolt" or rivet type along an interface which is common to the two assemblies, called the overlap zone or junction zone.

As an indication, there is generally a distinction made between so-called orbital seams suitable for assembling two assemblies, in this case called "annular portions" and which are approximately cylindrical in shape, and so-called longitudinal seams which are associated with assembling two assemblies whose shape is effectively a half-cylinder. Longitudinal seams are made along the generatrices of the running section whereas orbital seams are made in an interface zone between two transverse fuselage sections, where these two types of seams can be made along non-linear longitudinal generatrices and along non-circular transverse generatrices respectively when these assemblies are made on parts of fuselages which are located at the forward point or rear end of the aircraft, where the shape of the fuselage exhibits double curvature.

The process according to the invention could be applicable to the junction of an overlap zone which exhibits single or double curvature. For information, panels with a single curvature are referred to as "developable" and exhibit a rectilinear generatrix which implies that they may be "unrolled" onto a plane surface. On the other hand, double-curvature panels, such as the fuselage panels for an aircraft cockpit are not "developable" and therefore have no rectilinear generatrix; that is, they may not be "unrolled" onto a plane surface. In effect they exhibit a first curvature, for example in the longitudinal direction of the panel, together with a second curvature which is distinct from the first, for example in the transverse direction of the same panel.

THE EXISTING TECHNICAL SITUATION

In the field of assembling aircraft fuselage assemblies, the assemblies to be fixed firmly together by means of riveted or "lockbolt" seams generally have large dimensions, that is, each has a volume of several cubic meters. In addition, the tolerances relating to the assembly and interference of the fastening components are very tight, generally only a few hundredths of a millimeter, so that it is extremely difficult to pre-drill the panels that are intended to form the overlap zone for the two assemblies whilst ensuring that each of the holes is coaxial within the interference tolerance. Consequently, the assembly processes implemented are generally such that both two assemblies are drilled in the same drilling operation so that in this single operation a single hole for housing the fastening component is obtained, formed from the two holes produced respectively through the two panels which are at least partially superimposed.

The difficulty involved then lies in the fact that the interface assembly must usually be free of any burring or swarf otherwise the fatigue strength characteristics of the fuselage assembled in this way are reduced. Furthermore, in order to ensure a good seal at the interface between the assemblies, which is essential for maintaining pressurisation of the fuselage in flight, the latter is coated with a thin layer of sealant, or interposition sealant. Furthermore, in order to ensure that there is continuity of the transmission of mechanical forces within the fuselage, it is arranged so that contact between the two assemblies at each fastening component is metal-metal contact, that is, there is no coupling of forces through the interposition sealant.

In order to ensure that these various conditions are met, it is known for the following successive steps to be carried out:
 the reference positioning beforehand of the two assemblies, intended to bring the two assemblies into the set relative position, where these two assemblies thus positioned together form the overlap zone;
 drilling of assembly holes through the overlap zone, for subsequent fixing of the drilling grid;
 the fixing of one or more drilling grids onto the overlap zone using temporary means of fixing which fit into the assembly holes;
 drilling of holes through the overlap zone using a drilling tool designed to fit onto each drilling grid;
 removal of the drilling grids and disassembly of the two assemblies in order to clean and de-burr the panels at the holes and assembly holes;
 the application of interposition mastic onto the panels of the assembly intended to form the overlap;
 the reference positioning of the two assemblies, intended to bring these two assemblies once more into the set relative positioning, allowing the fastening devices to be put in place, where the two assemblies thus positioned together forming the overlap zone have a layer of interposition sealant between the two panels of this zone; and
 the fitting in place of the fastening components in their respective holes.

With this type of way of operating both the dismantling/separation and re-assembly operations for the assemblies, and the cleaning/de-burring operations on the latter extend the manufacturing cycle considerably, so that it becomes costly and is not optimised. In order to prevent such burring occurring at the overlap zone/junction between the two panels which is drilled during the same operation, one solution which is known in previous practice involves applying a set clamping force between these two panels. More precisely, the desired pressure is such that it allows a force to be applied over the overlap zone which on the one hand prevents burring occurring and on the other hand prevents swarf being trapped between the interface of two assembled panels which are coated with interposition sealant.

Nevertheless, the means generally used to produce this pressure are complex and difficult to put in place on the assemblies to be fixed together by seams, and this is another source of detrimental effects on the manufacturing cycle. To this end, because of the overall dimensions involved it is relatively difficult to fit these means of applying pressurisation when drilling grids are used, even though widely used in the field under consideration. Above all it is usually difficult or even impossible to fit them in place on overlap zones with a complex shape, such as overlap zones with double curvature or on assemblies which form so-called "closed" structures where access is difficult. Finally, means of pressurisation that are available in existing practice are essentially designed to be employed in the context of a fully automated assembly process, and are in no way suitable for manual assembly, for example in which the operator drills the holes manually drills and fits the fastening components in place using appropriate tools.

OBJECT OF THE INVENTION

The purpose of the invention is therefore to offer a procedure which remedies the above mentioned problems relating to implementation options that use existing technologies. More specifically, the purpose of the invention is to provide an assembly process which allows the required pressure to be applied in a simple manner over the overlap zone during the drilling of holes through this zone, in order on the one hand to avoid burring, and on the other hand to avoid swarf entering the interface between the assembled panels, usually coated with interposition sealant.

In order to do this, the object of the invention is a process for assembling two assemblies by means of multiple fastening devices intended to create a junction between two panels which are at least partly superimposed which belong respectively to the two assemblies and which together form an overlap zone, where the process involves the drilling of multiple holes through the overlap zone, where each of the holes is designed to house one of the fastening components, where the drilling of each hole is achieved using a drilling tool which passes through an associated centring hole made in a drilling grid securely fitted onto the overlap zone, where the drilling tool includes a mandrel for support on the overlap zone as well as an expanding ring which fits against the mandrel over a conical contact surface which, during the application of a relative movement along a central axis of the contact surface between the mandrel and the ring, allows expansion of this ring to occur, ensuring that it is immobilised in the associated centring hole. According to the invention, the application of the relative movement between the expanding ring and the support mandrel is achieved so that, following the immobilisation of the expanding ring in the associated centring hole, it causes a displacement of the mandrel supported against the overlap zone, through the associated centring hole and along the central axis of the conical contact surface in the direction of this overlap zone, in order to exert a pressure on the latter.

Thus the invention actually provides a simple and clever solution which allows the required pressure to be easily applied over the overlap zone during the drilling of holes through this same zone, in order on the one hand to avoid burring and on the other hand to avoid swarf entering the interface between the assembled panels, which are usually coated with interposition sealant.

In effect, the drilling tool used may be of the type conventionally familiar to those working in the field, such as manufactured by the Cooper Power Tools organisation and described as "P2 Drill with Concentric Collet Foot". This type of drilling tool is also described in document EP 0 761 351 A, which is included here for reference.

It should be noted that the means used to achieve the pressure over the overlap zone during drilling of the orifices are available using existing technology, and that the specific features of the invention lies in the specific use that is made of these means. In effect, in the drilling tools such as those indicated above, the present of the support mandrel and of the associated expanding ring is motivated solely by the need to immobilise the tool so that it does not rotate or undergo translation movement in a centring hole in the drilling grid, by the friction between the ring and this same centring hole. To do this the ring is made to move along the central axis of the conical contact surface between the ring and the mandrel, through the associated centring hole and in a direction opposite to the overlap zone against which the mandrel, immobilised relative to the centring hole, remains resting. This movement is stopped when the expansion of the ring in the hole in the grid is sufficient to stop the tool undergoing rotation or translation movement relative to the grid.

On the other hand, in the invention it is arranged so that the relative movement applied between the ring and the mandrel essentially takes the form of movement of the mandrel in the direction of the overlap zone, and not of a movement of the ring in the direction opposite to that of the overlap zone, even if the latter movement may be observed up until the ring is truly immobilised in the drilling grid centring hole. In this respect, the application of the relative movement between the expanding ring and the support mandrel is preferentially achieved so that it causes a displacement of the mandrel supported against the overlap zone, through the associated centring hole over a distance (x2) which meets the condition $x2>0.90.(x)$, where (x) corresponds to a total distance for the relative motion applied between the ring and the mandrel. The aforementioned relationship actually represents the desire to essentially obtain a movement of the mandrel through the centring holes rather than a movement of the ring through the same centring hole in an opposite direction. Those working in the field will naturally be capable of adapting the design of the various components in question in order to achieve an operation of this kind, in particular through the appropriate sizing of the nominal diameter of the expanding ring and of the centring hole. In this respect, it should be noted that a small initial play between the ring and the associated centring hole, for example less than 0.5 mm, and preferably of the order of 0.3 mm, is required in order to achieve extremely rapid immobilisation of the ring in the said drilling hole once the relative movement has commenced, where this play is however adequate to allow the expanding ring to be easily introduced into the centring hole before drilling. In this respect, it has been observed that tolerances H7 to H10, but preferably H7, for the drilling grid centring holes, could prove to be effective in obtaining the above desired effect.

Furthermore, the application of the relative movement between the expanding ring and the support mandrel is achieved so that at the end of the application a support mandrel pressure is exerted on the overlap zone of between about 600 and 1200 N. As will be described hereafter, the design of the special means employed to produce such a pressure means that the pressure which is to be exerted during application of the relative motion can be determined beforehand, as a function of the various known parameters.

Whatever it is, this pressure value is therefore entirely appropriate for, on the one hand, preventing burring occurring and, on the other hand, for preventing swarf entering the interface of the assembled panels which are usually coated with interposition sealant. Consequently, it is therefore advantageously possible to drill all holes in the overlap/junction zones in the same drilling step, followed by the fitting in place of all fastening components, without having to disassemble/reassemble the assemblies placed in reference positions beforehand, in the reference system of the aircraft when fuselage assemblies are involved.

Such a process in which all drillings are carried out, followed by all fitting and tightening of the fastening components, has the advantage of being very flexible in terms of manpower. In effect, a single individual can carry out all the steps required to produce the seam, since at no time is it necessary to have access to both sides of the fuselage at the same time, whether for installation of tools, drilling-countersinking, for removal of tools or for the fitting and tightening of fastening components.

On the other hand, this type of process according to the invention also allows several operators to work both on the inside and outside of the fuselage, so that the time for producing the seams is reduced. As a result it is notable that the process that is the subject of the invention offers great flexibility in terms of organisation of work for a given seam, depending on the production rates required, in contrast, for example, to the processes in current practice with so-called "separation", because of the meeting point associated with this separation/disassembly of the two assemblies after drilling.

The invention therefore offers a simple solution which provides a quick and easy fitting in place of means for applying pressure to the overlap zone, given that it is comparable to simply fitting a drilling tool in place in relation to the associated drilling grid. The manufacturing cycle is therefore greatly optimised. Furthermore, it can clearly be seen that the solution used offers no drawbacks in terms of overall dimensions, in contrast to that encountered in current practice, given that the means for applying pressure are made up of the drilling tool itself.

Furthermore, this ingenious way of applying the pressure during drilling of holes means that seams can easily be made in overlap zones with complex shapes, such as overlap zones with double curvatures, or even on assemblies which form so-called "closed" structures, given that access to a single side of the structure only is necessary to fit the drilling tool which generates the required pressure in place. Furthermore, the invention is as applicable to an automated procedure as to a procedure that is carried out, at least in part, manually, for example of the type in which operators drill holes manually as well as fitting in place of fastening components, using appropriate tools.

Finally, the process according to the invention of course allows so-called orbital seams to be made which are suitable for assembling two assemblies which are approximately cylindrical in shape, as well as so-called longitudinal seams which are associated with assembling two assemblies whose shape is effectively a half-cylinder.

The drilling grid is preferably made of aluminium or one of its alloys, and the expanding ring made of steel.

In effect it should be noted that the drilling grids must preferably be able to carry out the following functions:
- immobilisation of the drilling tool to prevent rotation and translation movement in the associated centring hole, solely by the frictional force of the expanding ring in the hole in the grid;
- a sufficient working life of the grid; and
- correct positioning of centring holes in relation to the assemblies to be assembled, irrespective of the surrounding conditions, in particular when there are variations of temperature during assembly.

In order to achieve this last function, the use of aluminium or of one of its alloys would seem to be entirely appropriate, in particular when assemblies are made of a similar or identical material, as is usually the case for aircraft fuselage assemblies. In effect, drilling grids then undergo thermal expansion in the same manner as the aluminium alloy fuselage.

Alternatively it may be advantageous to make drilling grids from reinforced carbon fibre composite material, in the case of fuselages made of such a material or similar material. Making grids out of this also offers the advantage of making them lighter and thus facilitates their handling by operators. These materials, however, exhibit relatively low wear resistance, which could be incompatible with the high level of requirements relating to the working life of such grids, designed to withstand the repeated insertion of an expanding ring into each centring hole.

Thus in order to deal with this problem of wear, another solution could be used which involves lining the centring holes of the grid with steel rings, where the grid itself is made of aluminium or one of its alloys or of a reinforced carbon fibre composite material. The first solution indicated above is preferentially used however, given that friction between the aluminium of the grid and the steel of the ring is about twice as high as for steel-steel friction, thus allowing the expanding ring to be immobilised in terms of rotation and of translation movement relative to the drilling grid.

This preferred solution however offers lower wear resistance. In this respect it seems that wear on the grids remains generally acceptable as long as it is uniform along the contact surface between the ring and the centring hole. In order to verify this condition, and also to prevent more marked wear at the entry and exit of the centring hole, the greatest possible contact area is preferentially sought between the ring and this centring hole. In order to achieve this, the drilling grid is designed and arranged so that prior to the application of the relative movement between the expanding ring and the support mandrel, when the drilling tool is positioned with its support mandrel through the associated centring hole and in contact with the overlap zone, the expansion ring emerges from either side of the associated centring hole. This preferred position should also preferentially be maintained until the ring is immobilised in the centring hole.

Thus it is preferable that the thickness of the grids is slightly less than the length of the expanding ring along the central conical surface axis. Consequently an initial separation of the grid in relation to the overlap zone to be assembled should also be envisaged.

The process preferentially includes a step for reference positioning of the two assemblies, intended to bring these two assemblies into a set relative position allowing the drilling of the holes to be carried out. In such a case, the drilling of the holes and a later step for fitting the fastening components in place in their respective holes are carried out successively whilst maintaining the set relative positioning obtained during the step for reference positioning of the two assemblies, which avoids the need for separation of the two assemblies after drilling, a step which is costly in terms of manufacturing cycle times.

Preferentially, the process includes the following successive steps, carried out whilst maintaining the set relative positioning obtained during the step for reference positioning of the two assemblies:
- the fixing of one or more drilling grids onto the overlap zone, with each drilling grid being provided with multiple centring holes;
- drilling of holes through the overlap zone, using a drilling tool designed to fit onto each drilling grid;
- removal of each drilling grid;
- the fitting in place of the fastening components in their respective holes.

More precisely, according to a first preferred option for implementation of the present invention, the process includes the following successive steps:
- the reference positioning of the two assemblies, intended to bring these two assemblies into the set relative positions which allow holes to be drilled, where the two assemblies thus positioned together to form the overlap zone have a layer of interposition sealant between the two panels of this zone;
- putting in place one or several first devices for applying pressure onto a first side of the overlap zone and putting in place one or several second devices for applying pressure onto a second side of the overlap zone, opposite the first side;

drilling of assembly holes through the overlap zone, for fastening the drilling grid, with each hole being made close to at least one first device for applying pressure and at least one second device for applying pressure;

removal of each first device for applying pressure;

fixing of one or more drilling grids onto the overlap zone, on its first side, using temporary means of fixing which fit into the assembly holes;

drilling of holes through the overlap zone, from the first side of the overlap zone using a drilling tool designed to fit onto each drilling grid, where each hole is made close to at least one second device for applying pressure;

putting in place of temporary fastening components where each passes through one of the holes made in the overlap zone as well as its associated centring hole made in the drilling grid;

removal of each drilling grid and the temporary means of fastening;

removal of each second device for applying pressure;

putting the fastening components in place in their respective holes, where this putting in place is achieved whilst maintaining the set relative positioning achieved during the step for reference positioning of the two assemblies; and the fitting in place of supplementary fastening components in the said assembly holes.

Alternatively, according to a second preferred option for implementation of the present invention, the process includes the following successive steps:

the reference positioning beforehand of the two assemblies, intended to bring these two assemblies into the set relative position, where the two assemblies, thus positioned, together form the overlap zone;

drilling of assembly holes through the overlap zone, for subsequent fixing of the drilling grid;

removal of the two assemblies in order to clean and de-burr the panels at the assembly holes;

the reference positioning of the two assemblies, intended to bring these two assemblies once more into the set relative positions allowing holes to be drilled, where the two assemblies thus positioned which together form the overlap zone have a layer of interposition sealant between the two panels of this zone;

putting in place one or more second devices for applying pressure onto a second side of the overlap zone, opposite a first side;

fixing of one or more drilling grids onto the overlap zone, on its first side, using temporary means of fixing which fit into the assembly holes;

drilling of holes through the overlap zone, from the first side of the overlap zone using a drilling tool designed to fit onto each drilling grid, where each hole is made close to at least one second device for applying pressure;

putting in place of temporary fastening components where each passes through one of the holes made in the overlap zone as well as its associated centring hole mode in the drilling grid;

removal of each drilling grid and the temporary means of fastening;

removal of each second device for applying pressure;

putting the fastening components in place in their respective holes, where this putting in place is achieved whilst maintaining the set relative positioning achieved during the step for reference positioning of the two assemblies; and the fitting in place of supplementary fastening components in the assembly holes.

In this second preferred option for implementation, in which there is therefore separation of the assemblies before the drilling of holes intended to house the fastening components is carried out, it is no longer necessary to assembly/disassemble the first devices for applying pressure, also known as clamping devices, such as those employed in the first preferred option for implementation, allowing cycle times to be reduced, even though this incorporates cleaning and de-burring of panels at the assembly holes that are made, after separation of the assemblies to be assembled.

The fastening components are preferably rivets or "lockbolts". For information, as is known to those working in the field, fastening components of the "lockbolt" type are in particular known from the patent U.S. Pat. No. 3,203,300. They may nevertheless take any other form whilst retaining the principle of expansion by traction of the shaft and of compression by a ring, without going outside the context of the invention.

Still in a preferential manner and as indicated above, the process applies to assembling aircraft fuselage assemblies, such as those making up the parts of the fuselage at the front point or the rear end of the aircraft, where the shape of the fuselage exhibits double curvature.

The process is thus preferentially implemented so that fastening components together form a so-called orbital seam.

Other advantages and characteristics of the invention will appear in the detailed non-restrictive description below.

BRIEF DESCRIPTION OF THE DRAWINGS

This description will be made with reference to the appended drawings, of which

FIG. 1 shows two assemblies to be assembled by implementing a process according to an embodiment of the present invention;

FIG. 2 shows putting in place several first devices for applying pressure onto the overlap zone according to an embodiment of the present invention;

FIG. 3 shows devices for applying pressure to be fitted on an internal side of a fuselage according to an embodiment of the present invention;

FIG. 4 shows that one or both suction pads may be replaced by press ends according to an embodiment of the present invention;

FIG. 5 shows assembly holes for subsequent fixing of the drilling grid according to an embodiment of the present invention;

FIG. 6 shows drilling grids fixed onto a zone of a first side by temporary fastening devices according to an embodiment of the present invention;

FIGS. 7-8 show a drilling tool that can be used according to an embodiment of the present invention;

FIG. 9 shows a relative movement applied between an expanding ring and a support mandrel according to an embodiment of the present invention;

FIG. 10 shows each rod in equilibrium under the effect of three parallel forces according to an embodiment of the present invention;

FIG. 11 shows that each hole drilled does not require a clip to be housed in it, according to an embodiment of the present invention;

FIG. 12 shows each drilling grid and temporary fastening component removed, which may only reveal some of the assembly holes, other holes housing fastening components, according to an embodiment of the present invention;

FIG. 13 shows that some assembly holes remain free on the overlap zone according to an embodiment of the present invention; and FIG. 14 shows the fitting in place of supplementary fastening components carried out in some assembly holes according to an embodiment of the present invention.

DETAILED DESCRIPTION OF A PREFERRED EMBODIMENTS

First of all with reference to FIG. 1, two assemblies 1a, 1b can be seen which are designed to be assembled by so-called orbital seams using rivets and by the implementation of a process according to a preferred means of implementation of the present invention, which will now be described. Here two assemblies 1a, 1b are involved which respectively form two transverse annular sections of an aircraft fuselage, preferably located at the front point or rear end of the aircraft, where the shape of the fuselage has double curvatures.

Figure 1:
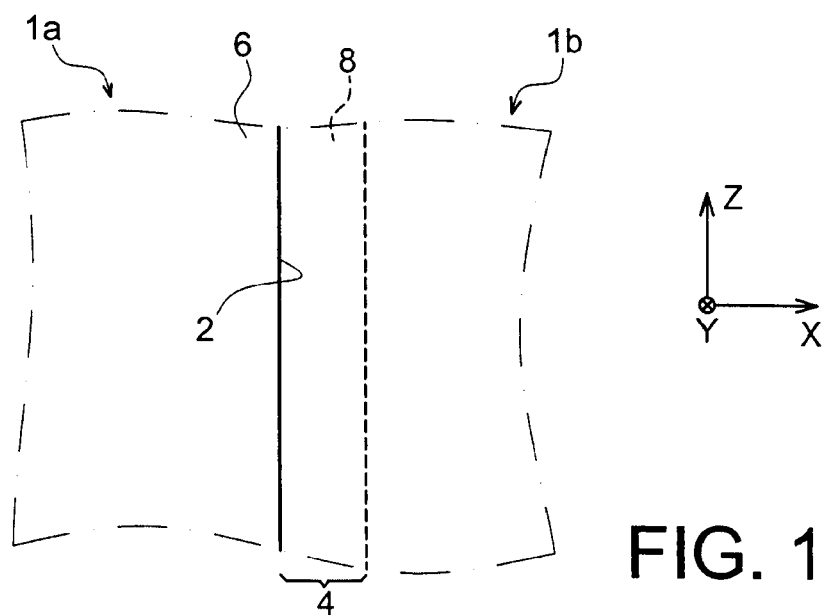
FIGS. 1 to 14 illustrate one preferred mode of implementation of the assembly procedure according to the present invention.

In this preferred option for implementation, the process starts, as shown in FIG. 1, with the reference positioning of the two assemblies 1a and 1b, intended to bring the latter together into a set relative position in the reference system of the aircraft, represented here by the references X, Y, Z. The reference positioning is such that it leads to the formation of an overlap zone 4, also known as the junction zone formed by the two panels 6, 8 which are at least partly superimposed and which belong respectively to the two assemblies 1a, 1b. Naturally the junction zone 4 is designed to receive the orbital rivet seam, as will be made apparent below. This means that following the reference positioning of these two assemblies 1a, 1b, the overlap zone obtained, in which a layer of internal sealant is found between the two panels 6, 8, is in an appropriate configuration for drilling of holes intended to house the various rivets for the seam. For information, it is preferentially envisaged that the internal sealant or sealing compound is placed on each of the two panels 6, 8 before the reference positioning of the two assemblies 1a, 1b.

Figure 2:
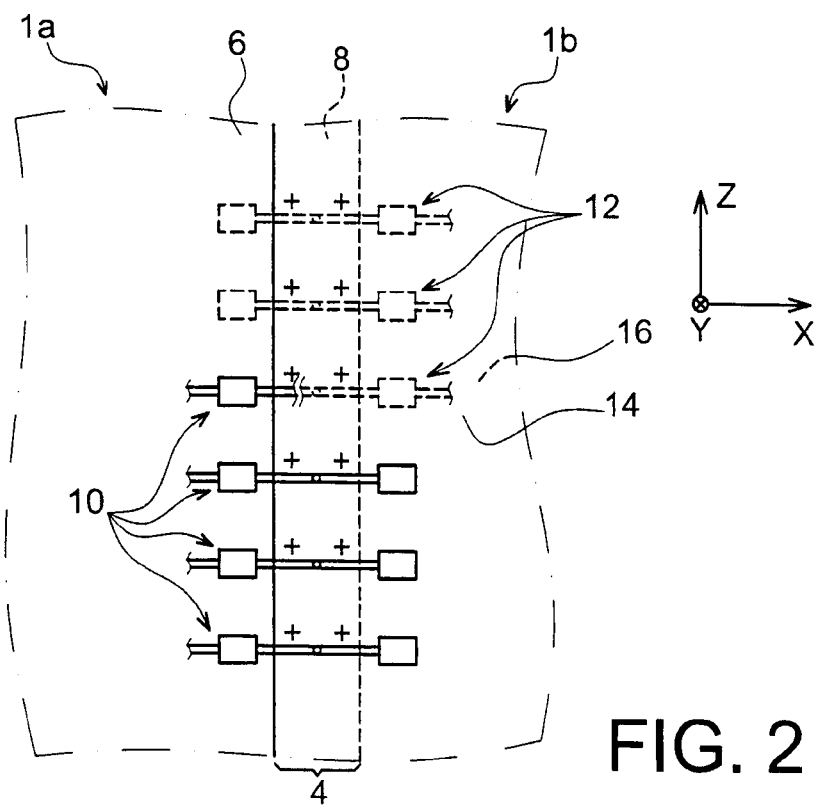

The next step represented in FIG. 2 involves putting in place several first devices 10 for applying pressure onto the overlap zone 4, on a first side 14 of the latter and putting in place several second devices 12 for applying pressure onto a second side 16 of the overlap zone, opposite the first side. For information, the first side 14 may form the external side of the aircraft fuselage and the second side 16 the internal side.

Thus, as can be seen in FIG. 2, these devices 10, 12, also called clamping devices and designed to together provide a significant clamping force between the two panels 6, 8, for example between 600 and 1200 N, are distributed along the length of the overlap zone 4.

Figure 3:
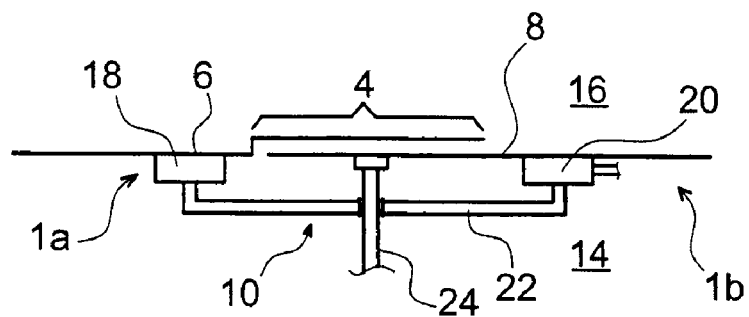

Preferably, and as shown in more detail in FIG. 3, the devices for applying pressure are of the suction pad type, that is, which include a first suction pad 18, placed against the panel 6, and a second suction pad 20 placed against the panel 8, where these suction pads are rigidly connected together by a junction bar 22 through which passes a pressure screw 24 resting on the overlap zone 4, and which is locally arranged effectively orthogonal to it. Naturally, the suction pads 18, 20 are connected to a means of creating a vacuum (not shown) which ensure that there is adhesion to the panels 6, 8 even when the pressure screw 24 is tightened.

In this respect, it is indicated that the pressure screw 24 allows pressure to be applied locally between the two parts of the zone 4, and therefore brings the panels 6, 8 together, the consequence of which is to make the interposition sealant, which is cool and not yet polymerised, flow, and thus metal-metal contact is achieved between these two panels coated with internal sealant and which are preferably made of aluminium alloy. As will be indicated below, the overlap zone 4 may then be drilled close to the screws 24 in order to achieve assembly holes, without burr formation at the interface or swarf or oil being introduced into the layer of sealant.

The clamping pressure applied is regulated by the tightening torque on the screw 24, tightened by means of a torque-release powered screwdriver. Conventionally, the local clamping force applied is ideally about 600 N, which corresponds to a tightening torque on the screw of the device for applying pressure of the order of 0.48 Nm. A pressure force of between 400 N and 1200 N can be applied without risk of deforming the assemblies to be assembled and without an excessive increase in the risk of burring. It should be noted that this fairly wide range enables imprecision in the regulation of the tightening torque and of the ratio between the tightening torque and the effective pressure at the interface to be absorbed.

Figure 4:
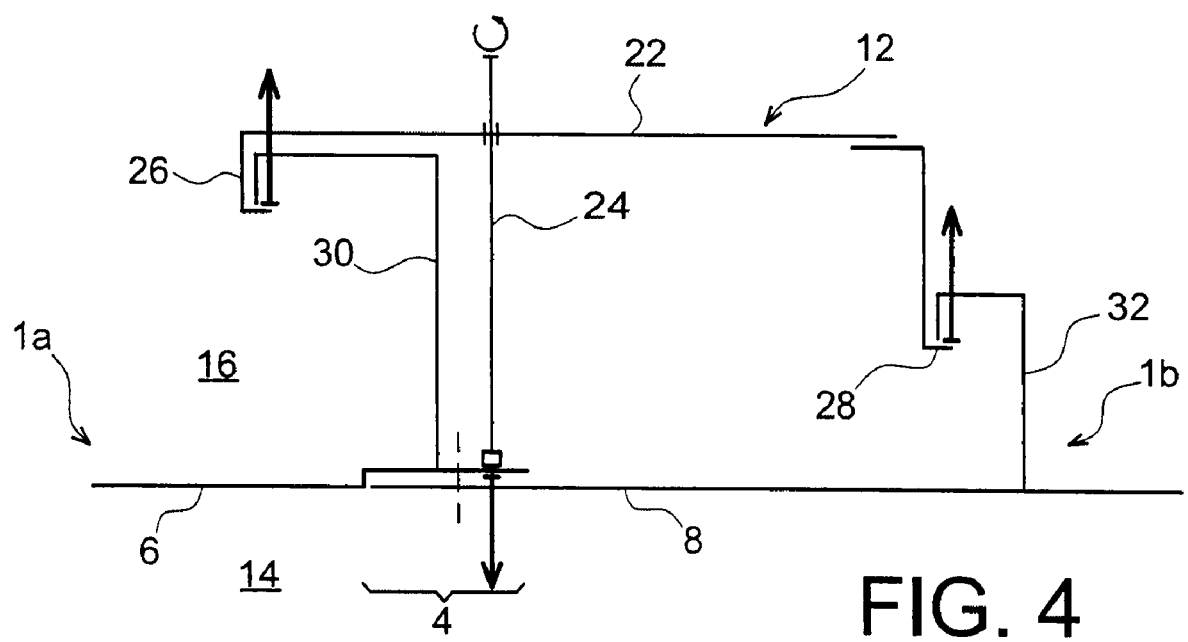

Several variants of the devices 10 shown in FIG. 3 may be envisaged, in particular for the devices for applying pressure 12 intended to be fitted on the internal side 16 of the fuselage. In effect, as is shown in FIG. 4, one or both suction pads may be replaced by so-called press ends 26, 28, where the latter are also rigidly linked by a junction bar 22 through which passes a pressure screw 24 resting on the overlap zone 4, whilst being locally arranged effectively orthogonal to it. Each press end is of a suitable shape allowing its translation movement to be immobilised in the direction opposite to that of the tightening of the screw 24, on a stiffener 30, 32 belonging to one of the assemblies 1a, 1b. For information, in comparison with tooling using suction pads, the clamp tooling in FIG. 4 is more reliable over time and above all less noisy, with the lack of reliability of the suction pad tooling being essentially due to the progressive wear of the sealing lips, and where the noise comes from the venturi-type evacuation equipment. The main advantage of clamp devices in relation to the suction-pad devices is due to the suppression of the source of compressed air required for the correct operation of the suction pads.

Naturally, it is also possible to combine these devices in order to achieve one press-type end and the other end of the suction-cup type without going outside the context of the invention.

As shown in FIG. 2, the devices 10 and 12 may possibly be arranged facing in twos on either side of the zone 4.

Figure 5:
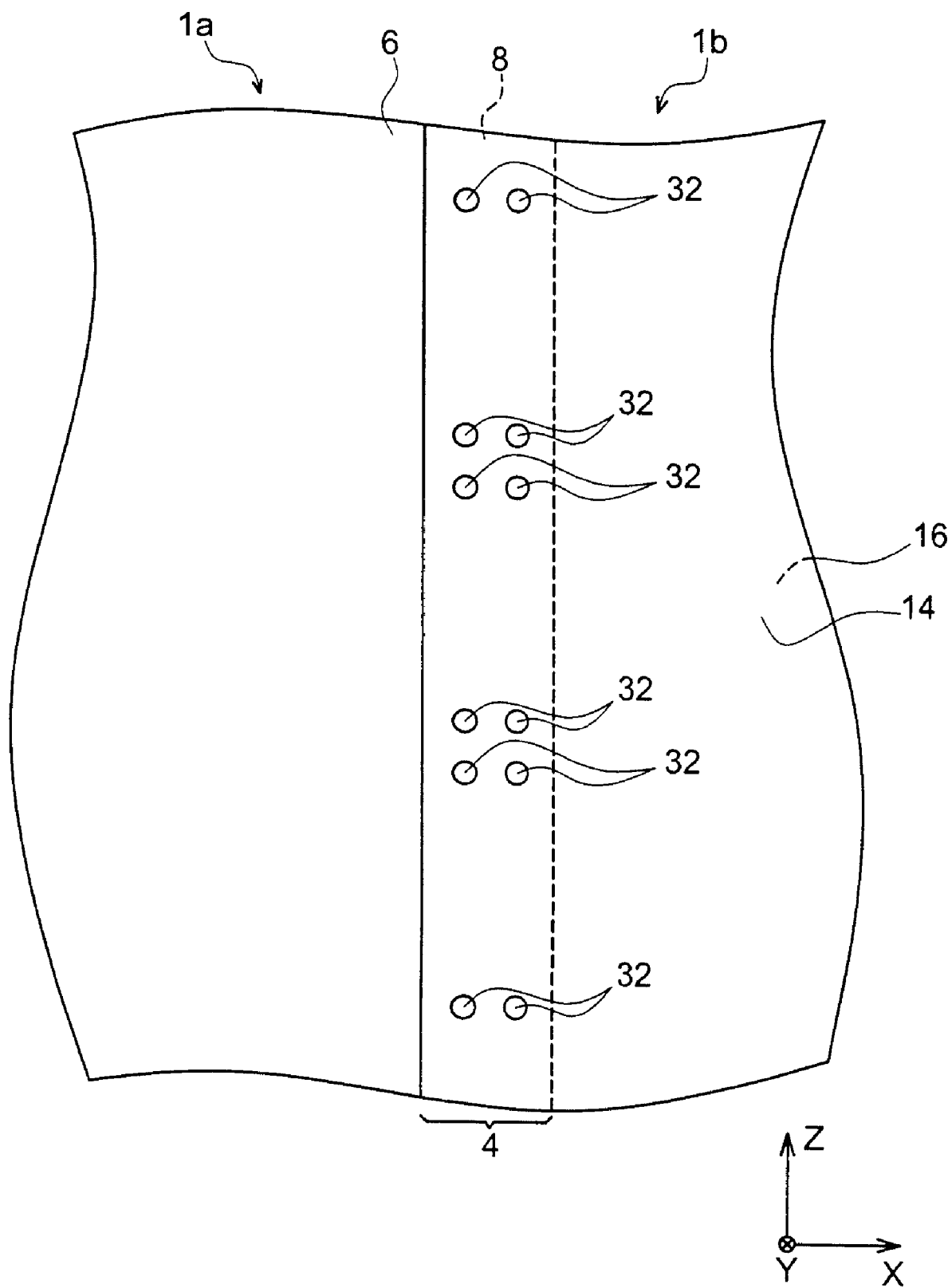

Then the process is continued by forming the aforementioned assembly holes through the overlap zone 4 with a drilling tool. These assembly holes 32 shown in FIG. 5 are therefore intended for subsequent fixing of the drilling grid, with each assembly hole 32 being made close to at least one first device 10 for applying pressure and at least one second device 12 for applying pressure, in order to obtain the positive effects described above associated with the application of a substantial pressure between the panels 6, 8.

Before the drilling grids are mounted on the overlap zone 4, the first devices 10 for applying pressure located on the external side 14 of the fuselage are removed.

Figure 6:
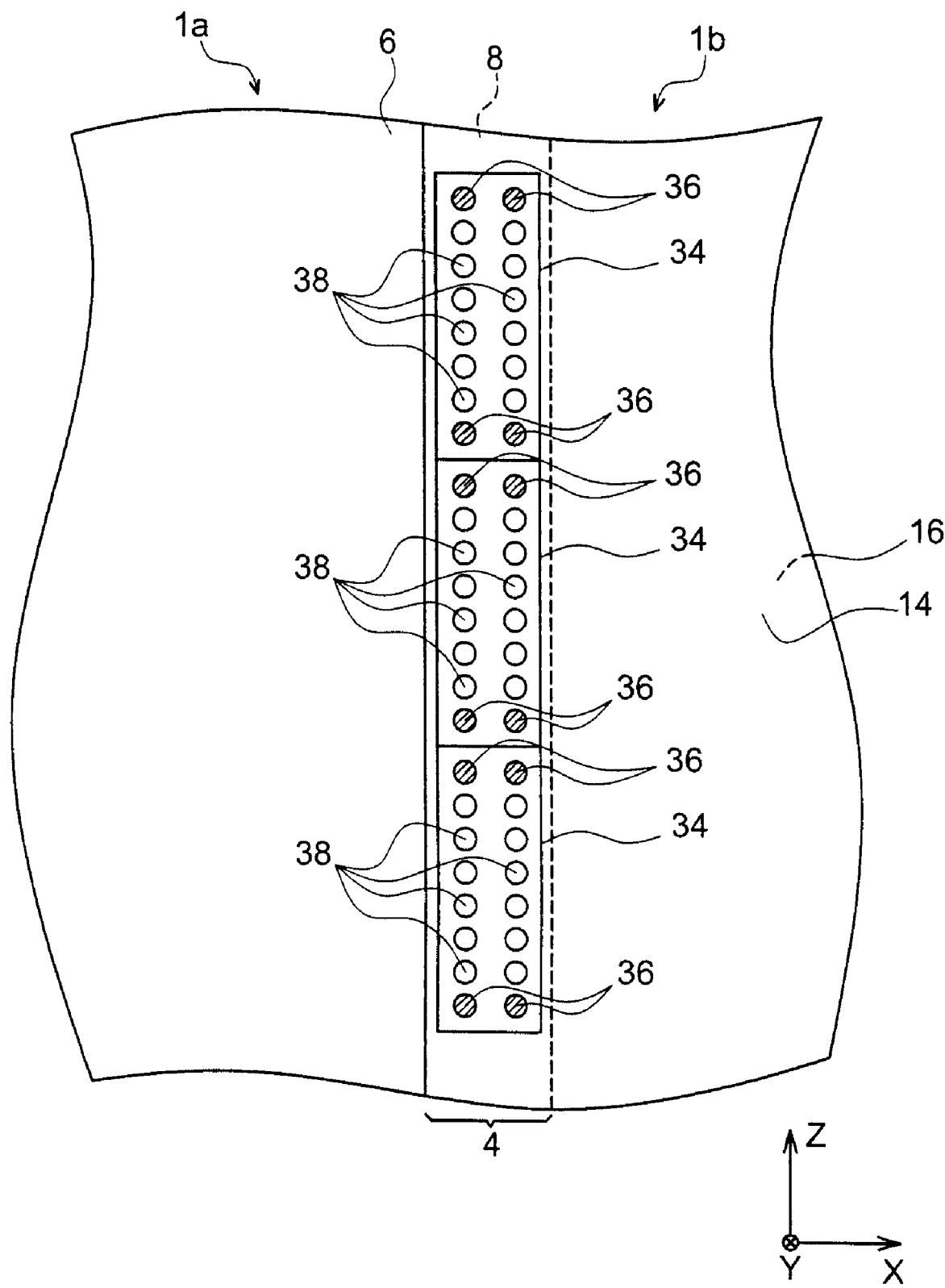

As will become evident in the remainder of the description, it should be noted that the subsequent drilling of holes at the locations of the fastening components designed for joining of the assemblies 1a, 1b, is actually carried out using the drilling grids 34 which allow the holes created in this manner to be precisely positioned. As can be seen in FIG. 6, these drilling grids 34 are fixed onto the zone 4 of the first side 14 by temporary fastening devices such as special clips 36 which each pass simultaneously though a hole in the grid and through an assembly hole 32 made beforehand for this purpose. The general principle behind such clips is described, for example, in patent EP 0 336 808, included here for reference. These special clips 36 therefore exhibit the special characteristic of fixing themselves in a hole in the grid, thus locating the latter relative to the assembly holes 32, and offer a reduced height, allowing a drilling tool equipped with a "concentric collet" type pressure foot to be installed in a hole adjacent to the holes occupied by the clip in question.

The grids 34 shown in FIG. 6 are therefore arranged successively and are preferentially joined together along the seam to be made, with the clips 36 ensuring the positioning and maintenance of these grids in relation to the overlap zone 4, and where the clips also exert a reduced contact pressure at the assembly interface.

In a preferential manner, the drilling grids 34, preferably made of aluminium or from one of its alloys, carry out three separate functions:
the correct positioning of holes on the fuselage, as a result of the centring of the drilling tool successively in each of the associated centring holes 38 made in the grids 34 as shown in FIG. 6,
immobilisation of the drilling tools against motion in rotation and translation during the drilling operation, and
the creation of a reaction element to provide pressure at the interface during drilling, with this forming one of the specific characteristics of the present invention.

As will be described below, in order to carry out all these functions the drilling holes exhibit set structural characteristics both from the point of view of sizing as well as the choice of materials from which they are formed.

Then the step involving drilling of holes through the overlap zone 4 is carried out from the first side 14 of the overlap zone 4, using a drilling tool designed to fit successively onto each drilling grid 34, where each hole is made close to at least one second device 12 for applying pressure and which remains in place for this step.

For information, the drilling in question here preferentially includes drilling and countersinking, which preferentially provides a solution for the following constraints:
precision of positioning of holes in the fuselage,
precision of the drilled diameter to ensure interference fit of the fastening component to be tightened,
precision in the depth of countersink to ensure flush-fitting of the head of the fastening component, so that there are no hollows or protuberances relative to the external fuselage,
no burring created at the interface, and
no swarf and cutting oil introduced at the interface provided with internal sealant.

In this respect, the precise positioning of the holes is assured by means of the drilling grids 34. In order to ensure the absence of burring and that no swarf or oil are introduced into the interface between the panels at the time of drilling, it is sought to apply a pressure which tends to bring these panels together in the neighborhood of the drill during drilling. As will be detailed below, the solution adopted in the present invention allows pressure to be applied in a manner which is concentric to the drill during drilling, where the means used are housed inside a centring hole in the grid and consequently have no adverse effect on the centring of the tool.

The drilling tool used may be of the type conventionally familiar to those working in the field, such as that manufactured by the Cooper Power Tools organisation and described as "P2 Drill with Concentric Collet Foot". This type of drilling tool is also described in document EP 0 761 351 A, which is included here for reference. This tool 40 is also shown in FIGS. 7 and 8.

In general terms, the drilling tool 40 is advantageously used in the present invention in order to:
position and maintain this tool on the grid by means of an expanding centring ring,
create a depth end-stop through contact of the end of a mandrel on the fuselage, and where
this forms a specific characteristic peculiar to the present invention, generating a contact pressure on the fuselage which is concentric to the drilling by using a mandrel, in order to ensure that there is direct contact of the panels to be assembled and to thus prevent burr formation and the introduction of swarf into the interface where interposition sealant has been applied.

The first two functions are known to those working in the field. The third, relating to the application of an interface pressure, is a consequence of the specific operating principles of the drilling tool 40 under specific conditions imposed at the drilling grids 34, preferably associated with the interface pressure generated by the device for application of pressure 12.

Figure 7:
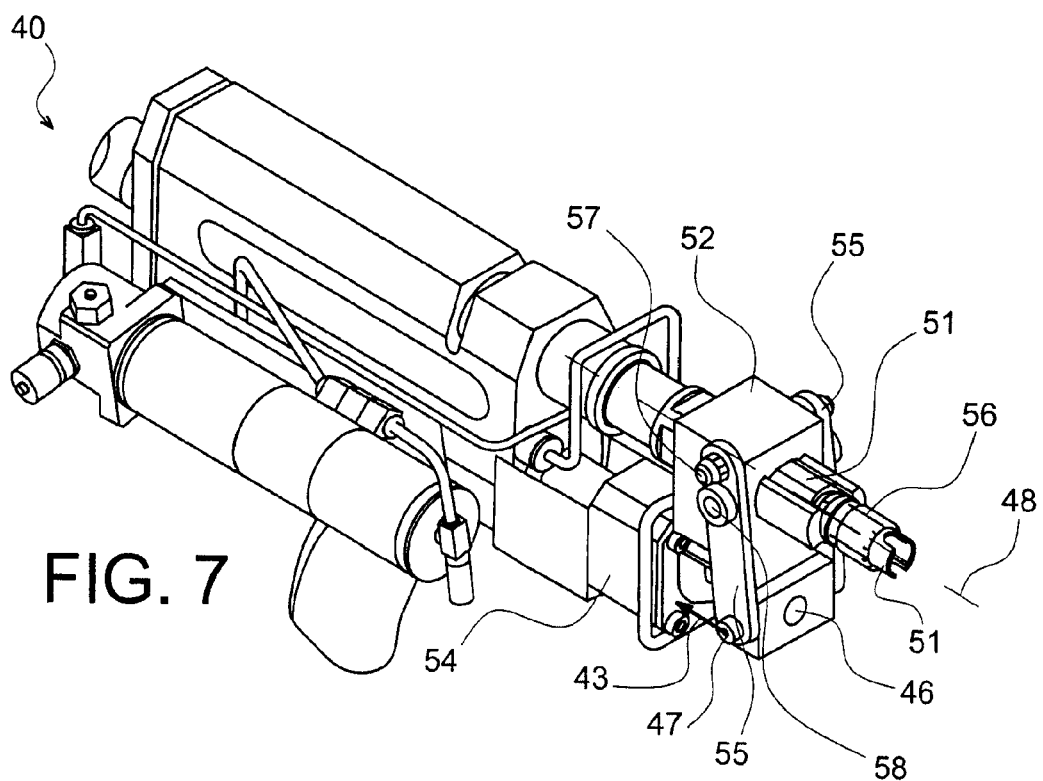
Figure 8:
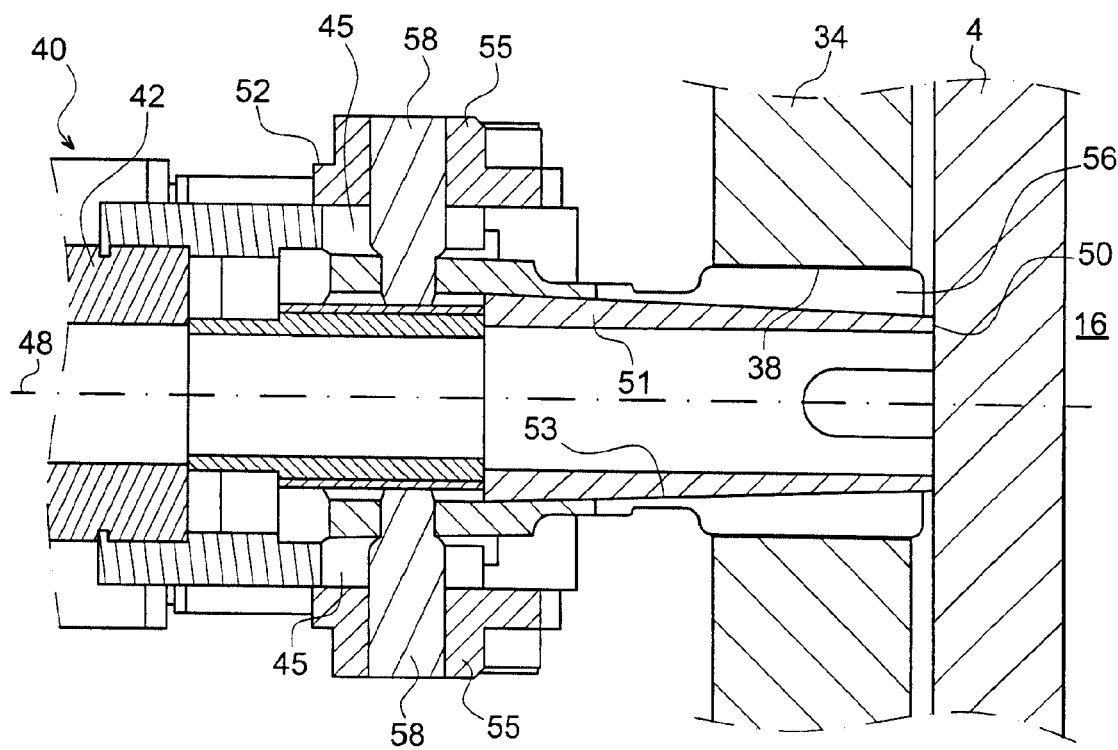

With reference therefore to FIGS. 7 and 8, the drilling tool 40 can be seen to be made up overall of a body 42 extending as a support mandrel 51 whose end 50 is designed to make contact with the overlap zone 4 during drilling. During the drilling of a hole in the fuselage, the drill (not shown) is designed to move inside and concentrically in relation to the support mandrel 51.

At the front part of the tool 40, the mandrel 51 is firmly attached to a pressure foot 52, which is itself firmly attached to a shaft 57 or upper shaft. Furthermore, an expanding ring 56, designed to be introduced into a centring hole 38 of a drilling grid 34, fits onto the mandrel 51 along a conical contact surface 53 which can be seen in FIG. 8. This conical contact surface 53, designed so that it narrows as the end 50 of the mandrel is approached, during application of a relative movement along a central axis of the conical contact surface 48, between the mandrel 51 and the ring 56, allows an expansion of this ring to take place, resulting in it being immobilised in the associated centring hole 38. More precisely, and as will be detailed later, the application of the relative movement between the expanding ring 56 and the mandrel 51 is achieved so as to produce, following immobilisation of the expanding ring 56 in the associated centring hole 38, a movement of the mandrel 51 supported against the overlap zone 4, through the associated centring hole and along the central axis of the conical contact surface 48 in the direction of this overlap zone in order to exert a pressure on the latter.

In order to achieve this relative movement, the tool 40 includes an actuator piston 54 which is firmly fixed to the body 42, whose end 46 is connected through a shaft 47 or lower shaft, to a pair of rods 55, and more precisely to a lower end of these rods 55 whose upper ends are articulated on the aforementioned upper shaft 57. Furthermore, between the parallel shafts 47 and 57, the tool 40 has an intermediate shaft or double intermediate shafts 58 firmly fixed to the expansion ring 56, where this shaft 58 passes through the holes 45 made in the pressure foot 52.

Thus this tool 40 is designed so that when the actuator piston 54 is operated in the direction of the arrow 43 in FIG. 7, the effect of this is to apply a displacement of the lower end of the rods 55 in the same direction as that of the arrow 43. Such a movement of the rods 55 caused by the actuator piston 54 actually produces a relative displacement between the ring 56 and the mandrel 51, a relative displacement which, because of the contact along the conical surface 53, produces an expansion of the ring 56. More precisely, in its operating principle as described in existing technology, operation of the actuator piston 54 produces a movement of the ring 56 towards the rear whilst the mandrel remains immobile supported against zone 4, that is, the shaft 57 acts as a pivot and the shaft 58 moves in the opposite direction to that going towards the panels to be assembled, that is along the arrow 43, through the holes 45 in the pressure foot provided for this purpose. Thus in this case it is the ring 56 which by expanding simultaneously undergoes movement relative to the centring hole in which it is placed, and not the mandrel, which remains fixed in relation to this same centring hole. Still with reference to the existing technology, the relative movement is stopped when the expansion of the ring is sufficient to stop the tool undergoing rotation or translation movement relative to the grid equipped with the centring hole in question.

In the process according to the present invention, it is in contrast arranged so that the relative movement applied between the ring 56 and the mandrel 51 essentially results in movement of the mandrel in the direction of the overlap zone 4, and not as a movement of the ring 56 in the direction opposite to that of the overlap zone, even though this last movement may be observed up to the point where true immobilisation of the ring 56 in the centring hole 38 of the drilling grid 34 is achieved. In this respect, those working in the field will naturally be able to adapt the design of the various components in question in order to end up with such an operation, in particular by appropriate sizing of the nominal diameter of the expanding 56 and of the centring hole 38. As shown in FIG. 8, which represents the tool 40 before operation of the actuator piston 54, and just after its introduction into the centring hole 38, a small initial play between the ring 56 and the centring hole 38, for example less than 0.5 mm and preferably of the order of 0.3 mm, allows immobilisation of the ring to be easily achieved in this same drilling hole very rapidly after the start of application of the relative movement, where this play is nevertheless sufficient to ensure easy introduction of the expanding ring into the centring hole before drilling. In this respect, it has been observed that the application of tolerances H7 for the centring holes 34 in the drilling grid 38 could prove to be effective in obtaining the above desired effect.

Figure 9:
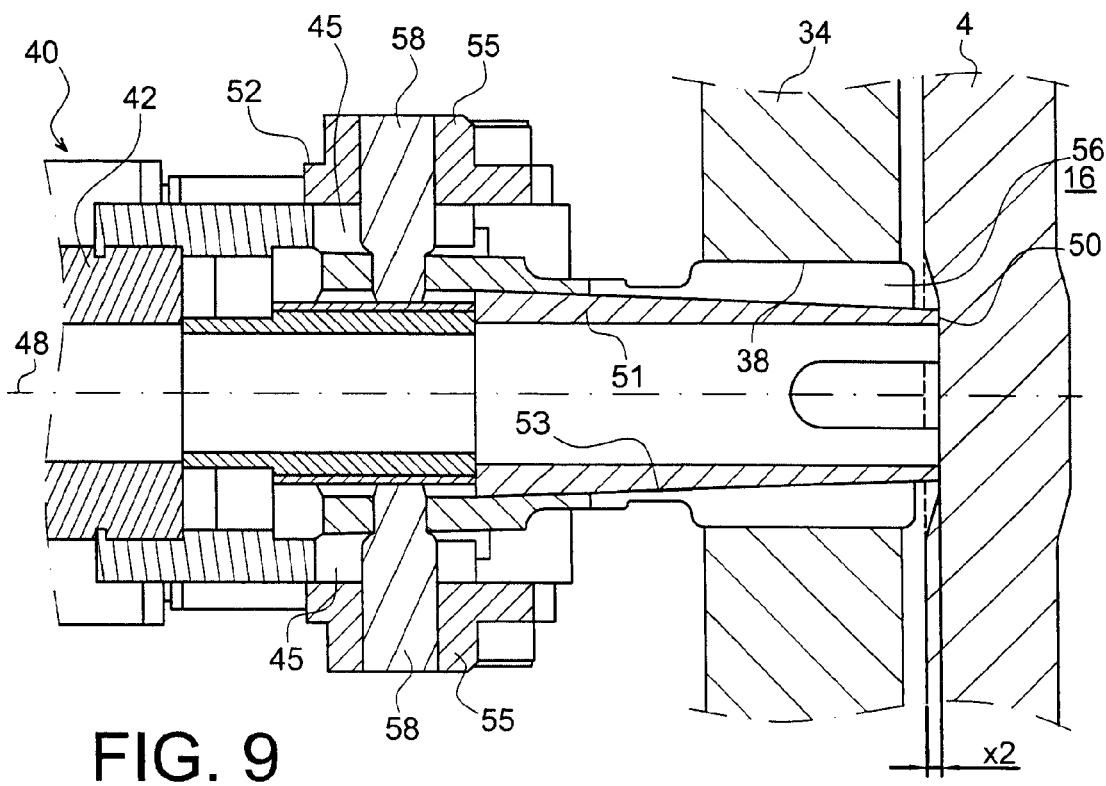

Furthermore, application of the relative movement between the expanding ring 56 and the support mandrel 51 is preferentially achieved so as to cause movement of the mandrel supported against the overlap zone 4 and through the associated centring hole 38, over a distance (x2) shown in FIG. 9, which meets the condition (x2)>0.90.(x), where (x) (not shown) corresponds to a total distance for the relative motion applied between the ring 56 and the mandrel 51. The aforementioned relationship effectively expresses the desire to essentially achieve a movement of the mandrel 51 through the centring hole 38, rather than movement of the ring 56 through this same centring hole 38 in an opposite direction.

Consequently, in contrast to existing practices, application of the relative motion is achieved so as to achieve a movement of the mandrel 51 along the X, Y, Z reference system of the aircraft, drawing with it the part of the zone 4 to which pressure is applied, as shown in FIG. 9, where the ring 56 remains effectively immobile in this same reference system.

In practice, it has been observed that the shaft 58 acts as a pivot by remaining immobilised in the X, Y, Z reference system of the aircraft, and that the shaft 57 moves in the direction towards the overlap zone 4, opposite to the direction of the arrow 43.

Such a situation has the advantage of being able to apply, in the zone contiguous to the drilling, through the specific operation that is sought, a force which applies pressure which may be sufficient to ensure that:
  the sealant flows in the immediate neighborhood of the hole in the fuselage, so as to ensure that there is metal-metal contact between the two panels in the zone 4;
  the introduction of swarf and cutting oil at the interface is prevented and
  the formation of burring at the interface drilling entry and exit point is avoided.

It will now be shown that the contact pressure exerted by the mandrel 51 of the tool 40 during the drilling of an orifice in the fuselage may be controlled as a function of the various parameters.

At the conical contact surface 53 between the mandrel 51 and the ring 56, the mandrel 51 applies force on the ring through a pressure which is proportional to the relative displacement of these two components, and which is normal to the contact surface. In addition it experiences friction at an angle $\phi 1$ whose tendency is to appose the relative displacement.

During its expansion in the hole 38 in the drilling grid 34, the ring 56 experiences a radial pressure $P_{56}$ which is proportional to the relative displacement between the mandrel 51 and the ring 56. If this displacement is $\Delta x$, the resulting increase in pressure $\Delta P_{56}$ is such that:

$$\Delta P_{56} = K \Delta x \, tg\alpha/S$$

where K is a constant which is a function of the elasticity of the components present, with S being the surface contact area between the ring 56 and the hole 38 of the grid 34.

If $\phi 2$ is the coefficient of friction at the interface between the ring 56 and the hole 38, $F_{56}$ is the axial resultant of the friction forces on the ring 56 in the hole:

$$F_{56} = P_{56} \cdot S \cdot tg\phi 2$$

First of all a first situation is considered in which there is no reaction from the overlap zone 4 against the mandrel, that is, the tool is centred and immobilised in the drilling grid 34 without it facing an obstacle. The ring 56 is introduced without or practically without any play into the hole in the grid 3. Under these conditions, when the actuator piston 54 is operated, two kinematic actions could occur. In the first kinematic sequence, the one that is most likely and which corresponds to the desired effect, the shaft 58 remains immobilised in the reference system X, Y, Z of the aircraft and acts as a pivot. In the second kinematic sequence, which is in contrast to the first, it is the shaft 57 which remains immobilised in the X, Y, Z reference system of the aircraft and which acts as a pivot, since the ring 56 moves in relation to the grid 34 in the opposite direction to that of zone 4.

Since the actuator piston 54, the shaft 57 and the shaft 58 are linked by rigid rods 55, then for these two kinematic sequences the relative speed and displacement between the components 56 and 51 are the same.

Since the forces applied on the mandrel 51, on the ring 56 and actuator piston 54 are proportional to this relative displacement, they are also the same for the two kinematic sequences. Thus the most likely kinematic sequence is that which leads to the dissipation of minimum amount of energy. In this respect the energy provided by the actuator piston 54 is distributed as follows:

for the first kinematic sequence between the friction at the conical surface 53 between the components 51 and 56, the radial elastic deformation of the various components (grid 34, ring 56, mandrel 51) following expansion, and friction at the articulated links;

for the second kinematic, between the same sources of dissipation as those mentioned above, since they have the same intensity, to which are added the friction between the ring 56 and the centring hole 38.

In energetic terms, the first kinematic sequence is therefore more favourable, and it is therefore this one which will actually be observed during the implementation of the process. Thus, once there is contact between the ring 56 and the centring hole 38 of the positioning grid 34, the ring 56 remains immobilised in relation to the grid and the action of the actuator piston 54 leads to the "extraction" of the mandrel 51.

In addition, by assuming the case of the first kinematic sequence indicated above, with no obstacle in front of the mandrel, the operation of the actuator piston 54 causes the mandrel 51 to move in relation to the grid 34 in the direction of the zone 4 and along the axis 48, until the force applied on this actuator piston is equal to the reaction force from the ring 56 on the mandrel 51, where this force is consequently called $F_{51}$.

By isolating the mandrel 51 in this equilibrium situation, on condition that the end of travel for the actuator piston 54 has not been reached before this state, along axis 48 which also corresponds to the drilling axis, the mandrel 51 is in equilibrium under the effect of two forces which are therefore equal in intensity and in opposite directions, namely:

$F_{54} + F_{57}$, respectively the forces applied by the actuator piston 54 and by the shaft 57 and the reaction of the ring 56 on the mandrel 51, namely $F_{51}$.

Figure 10:
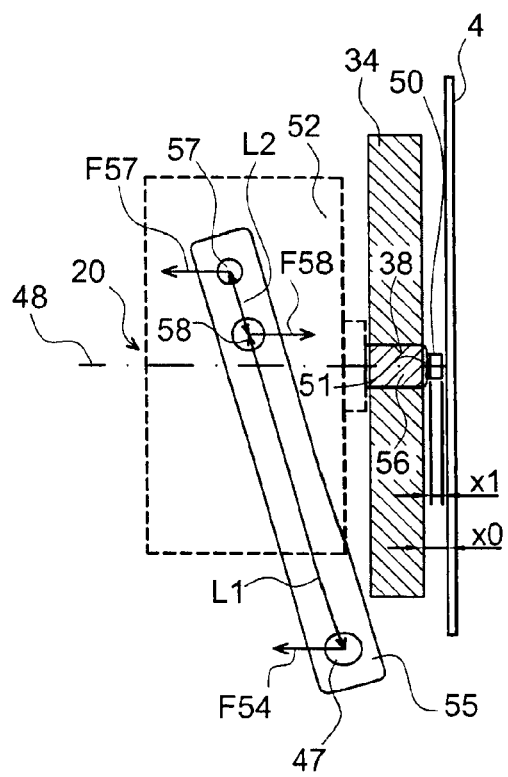

Each rod 55 is in equilibrium under the effect of three parallel forces $F_{54}$, $F_{57}$ and $F_{58}$, as shown in FIG. 10. It can be deduced from this that:

$$F_{57} = \frac{L1}{L2} F_{54},$$

where lengths L1 and L2 respectively correspond to the distance between the shaft 47 and shaft 58, and the distance between the shaft 58 and the shaft 57; and $$F_{51} = F_{54}^{MAX}\left(1 + \frac{L1}{L2}\right),$$

where $F_{54}^{MAX}$ is the maximum force applied by the actuator piston 54.

It should be noted that this force is obtained for a displacement of the mandrel 51 along the axis 46 through a distance of $x_1$ and is shown schematically on FIG. 10, from its initial position counting from the start of contact between the ring 56 and the hole 38 in the grid 34.

As indicated earlier, the force $F_{51}$ is proportional to the relative displacement between the components 56 and 51, and therefore proportional to the displacement $x_1$, that is $F51 = C_{51}x_1$, where C51 is a stiffness coefficient which accounts for this proportionality.

Assuming now a different configuration in which an obstacle, in this case the overlap zone 4, is positioned against the mandrel 51 in its initial position relative to the grid when the actuator piston 54 is operated, the mandrel 51 will then move until it reaches the equilibrium position $x_2$ under consideration along the axis 46, a position such that:

$$x_2 < x_1,$$

and $$F_{54}^{MAX}\left(1 + \frac{L1}{L2}\right) = C_{51}x_2 + R$$

It can be deduced from this that the reaction R, equivalent to the thrust force/pressure force on the fuselage is given by:

$R = C_{51}(x_1 - x_2)$, that is $$R = F_{54}^{MAX}\left(1 + \frac{L1}{L2}\right)\left(1 - \frac{x_2}{x_1}\right)$$

It is therefore possible, in particular, by carefully selecting the adjustment of the non-expanded ring 56 in its nominal position in the centring hole 38 of the drilling grid 34, by the distance between the grid 34 and the overlap zone 4, by selecting the capacity of the actuator piston 54, and if appropriate by the ratio of the lever arms at the rods 55, to control, within a given range, on the one hand the required travel necessary to achieve metal-metal contact between the panels at the assembly interface and on the other hand the pressure force to be applied. These adjustments may be achieved, for example, through successive trials.

For information, once this equilibrium position has been reached, the force remains applied on the overlap zone 4, the withdrawal of the mandrel 51 under the action of the elastic reaction being prevented by the friction which is present between the conical surface of the mandrel 51 and that of the ring 56, on condition that R is such that the corresponding reaction does not pass outside the adhesion cone.

Thus the mandrel 51, after release of the actuator piston 54 is in equilibrium along the axis 46 under the effect of two forces, namely:

R, and the reaction which corresponds to R which is:

$$C_{51}x_2 \frac{\tan(\varphi 1 - \alpha)}{\tan(\alpha)} \geq R = F_{54}^{MAX}\left(1 + \frac{L1}{L2}\right) - C_{51}x_2$$

Note <<T>> the ratio $$\frac{\tan(\varphi 1 - \alpha)}{\tan(\alpha)},$$

for a given position $x_2$. Rmax is therefore defined by:

$$\left(F_{54}^{MAX}\left(1 + \frac{L1}{L2}\right)\right)\tau = R\max(1 + \tau)$$

that is, $$R_{max} = F_{54}^{MAX} \frac{\left(1 + \frac{L1}{L2}\right)}{\left(1 + \frac{1}{\tau}\right)}$$

<<T>> is calculated by assuming that the radial pressure is proportional to proportional to tan(α), where α is the half-angle of the cone of the contact surface 53. The friction force which opposes the <<ejection>> of the mandrel 51 under the action of the elastic reaction of the fuselage is reversed in relation to the frictional force which opposes the sliding of the mandrel 51 in the ring 56, hence the expression tan(φ1−α) instead of tan(φ1+α) found for $F_{51}$.

In the preferred case of the tool 40 as described above, of the <Concentric Collet>> type, $$\frac{L1}{L2} \cong 5,$$

α=2.5°, φ1=8°. Consequently $$\frac{1}{\tau} = 0,45,$$

from which potentially $R_{max} \cong 4F_{54}^{MAX}$.

That is $$\frac{x_2}{x_1} = \frac{1}{3},$$

which assumes a high contact stiffness between the overlap zone 4 of the fuselage and the end 50 of the mandrel 51.

In practice, the travel values are not a priori adjusted in this way, and the contact stiffnesses are not sufficient to achieve such conditions. More generally, it is observed that $R \cong F_{54}^{MAX}$. In all cases therefore there exists a satisfactory safety margin in relation to the stability of the system.

The actual observed value for the force is explained inasmuch as starting with the initial contact of the mandrel 51 with the fuselage, initially the effect of the displacement of the mandrel along the axis 46 effectively is to cause the interposition sealant to flow. The force R is due to the flow of the sealant and to the local elastic deformation of the external panel. This process continues over a distance of the order of a millimeter, until metal-metal contact is established. At this point the force R increases more rapidly, since the deformation this time involves a double thickness, namely both panels 6, 8 and is supported nearby by devices for applying pressure 12 on the interior side of the fuselage, which are still in place. The ratio $$\frac{x_2}{x_1}$$

is therefore of the order of 0.8 to 0.85. In consequence it is clear that the system is highly tolerant in terms of variations in distances between the two panels 6, 8 to be drilled.

Consequently the pressure force commonly used for applying pressure to the panels by the drilling tool is easily between 600 N and 1200 N, depending on the thickness of the panels present.

Other types of drilling tools could also be employed for implementing the procedure according to the invention, such as, for example, variants which use either an actuator piston acting directly on the ring 56, or cam systems instead of the rods 55, with the principle for operation and for adjustment of the parameters associated with the grid 34 being equivalent in all respects.

Referring once more to FIG. 10, the thickness of the grid 34 is preferentially envisaged to be slightly less than the length of the ring 56 along axis 46. It also arranged that the distance $x_0$ between the lower face of the grid 34 at the hole and the fuselage 4 is such that the ends of the ring 56 protrude on either side of the centring hole 38, during introduction of this ring into the latter, an introduction stopped by contact of the mandrel 51 with the fuselage 4. Thus the distance $x_0$ is preferentially fixed so that:

- the appropriate pressure force can be applied close to the hole to be drilled (distance $x_2$ relative to $x_1$ <<no load>>);
- both ends of the ring 56 are outside the centring hole 38 (distance $x_0$).

Both these conditions are set by the height of the grid support feet on the fuselage, that is, the height of the clips 36, and by the manufacturing tolerance of the form of this grid 34 in comparison with the tolerance in form of the fuselage at the location of the grid. Those working in the field may determine this distance and the tolerance for this distance by a conventional chain of dimensions calculation. The manufacturing tolerance will be as large as possible if the ratio $$\frac{x_2}{x_1}$$

is carefully chosen. Under the conditions stated above, with a ratio $x_2/x_1$ of the order of 0.85, that is, such that the condition $R \cong F_{54}^{MAX}$ is verified, the tolerance over the distance $x_0$ is +/−0.2 mm. This condition proves to widely satisfactory for industrial manufacture of drilling grids 34.

The technical problem which therefore involves ensuring suitable pressure conditions at the interface during drilling is consequently resolved by a logical selection of drilling grid characteristics (material, dimensioning etc.) in relation to the operating characteristics of the so-called "Concentric collet" drilling tool and the pressure requirements at the interface at the overlap zone. Given that the pressure is preferably between 400 N and 1200 N, and ideally about 600 N, these conditions may be achieved by:

- adjustment of the distances $x_1$ and $x_2$ through the distance $x_0$ and by adjustment of the centring orifice 38;
- selecting the "operating point" (distance $x_2$) for the drilling tool in relation to the fuselage 4;
- the force developed by the actuator piston 54; and
- the choice of component material for the grid 34 and preferably the absence of steel skirting in the centring holes.

The application of pressure to the overlap zone 4 is naturally carried out slightly before the drilling of the required hole in this zone itself, with the drilling being carried out using a drill (not shown) crossing through the mandrel 51 in an axial manner which for its part continues to exert the required pressure in order to prevent formation of burring anywhere in the panels 6, 8.

More precisely, drilling-countersinking is carried out using a countersinking drill in a single operation. The mandrel 51, whose end 50 is in contact with the fuselage 4, defines an axial end-stop which ensures precision in terms of depth of the countersink. The countersink depth is set so that suitable conditions for flush-mounting of the rivet head are ensured. The suitable adjustment of the depth of the countersink is determined for example by means of laboratory testing which define the depth of countersink required in order for the flush mounting conditions of the head to be verified after it is flattened, for each rivet diameter.

Stopping penetration, that is, stopping the advance of the tool is achieved by an end-stop connected to the mandrel 51, itself in contact with the fuselage. Thus the depth of countersink may be ensured even in the event of fluctuation of the distances $x_0$ and $x_2$.

The drilling/boring of aluminium alloys, which make up the majority of current fuselages remains a difficult operation without lubrication. Liquid cooling is avoided here because of the risk of introducing cutting fluid at the interface at which internal sealant has been applied. To this end, drilling is preferentially carried out under oil micro-spraying, through the centre of the tool or laterally when drilling is carried out at high cutting speeds, that is, of the order of 15000 rpm or more.

The amount of lubrication is preferably adjusted to suit the drilling and countersinking diameters, and is generally fixed within an interval of from 3 to 50 ml per hour of lubricant whose maximum viscosity is 400 $mm^2$/sec. This additional micro-spayed oil greatly improves the drilling quality and allows less powerful and therefore lighter drilling tools to be used and penetration force to be reduced. The use of an oil micro-spray is made possible by the sufficient pressure present at the metal-metal interface at the junction, and which, combined with the small quantities, the viscosity of the oil and possibly with aspiration, prevents any possibility of oil being introduced into the interposition sealant.

Advantageously, the machine may be equipped with an aspiration device at the pressure foot 52, in order to remove swarf and oil vapour to a recovery unit. This evacuation prevents any contamination of the sealant joints located outside the fuselage. For this same reason, namely for ease of evacuation of swarf, the use of helical fluted drills is preferable.

Under certain circumstances swarf may be projected inside the internal fuselage on leaving the hole. This may then be deposited on the assembly interface, particularly in the bottom part of the aircraft, and could therefore be introduced into this interface. Under these conditions it is advantageous to protect the interface line, reference 2 in the figures, with a so-called "masking tape" adhesive strip.

Figure 11:
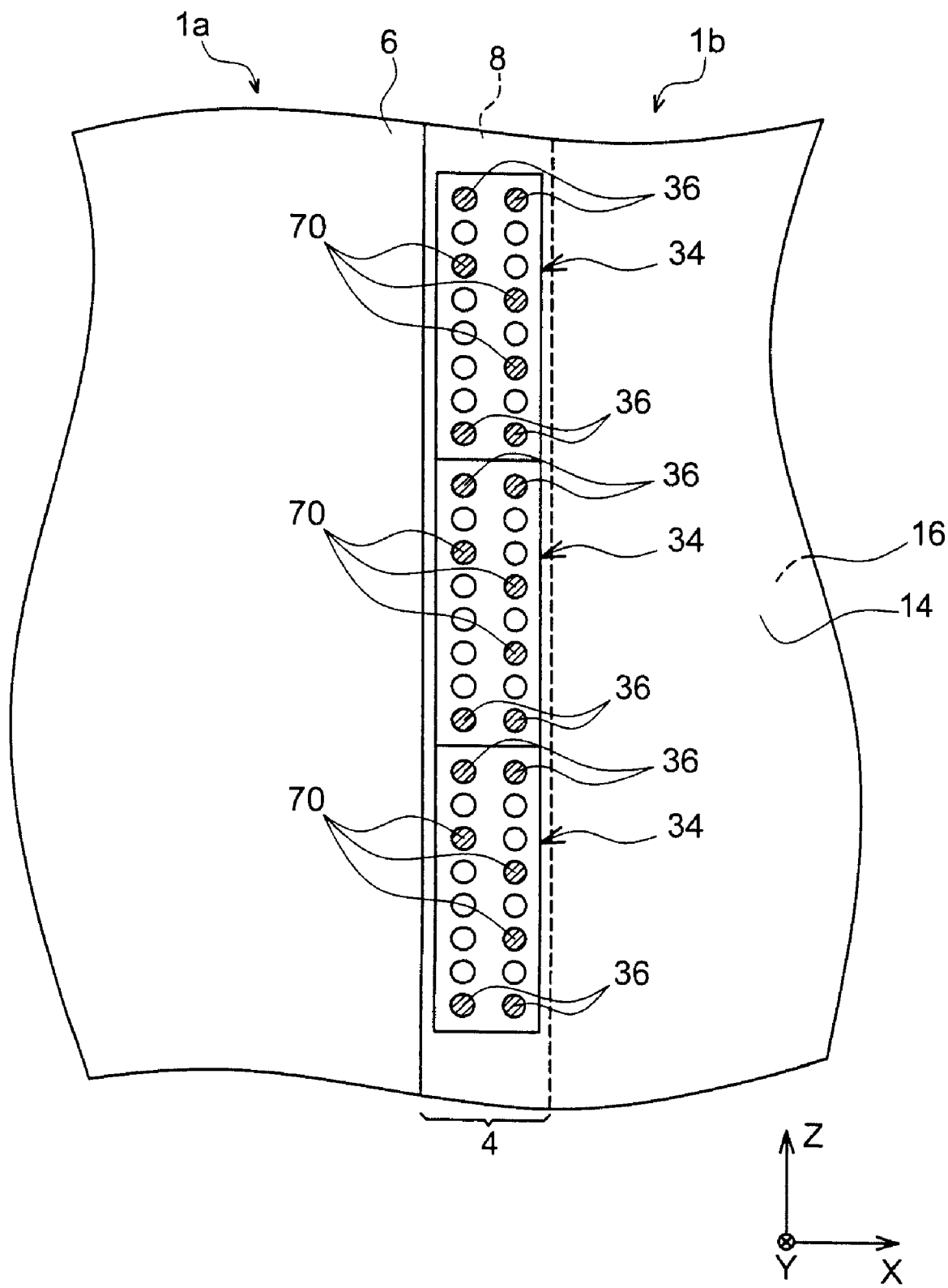

Once all holes have been drilled using the tool from the outside 14 of the fuselage, temporary fastening components 70 are put in place, where each could also take the form of a clip. It should be noted that each clip 70 therefore passes through one of the holes made in the overlap zone 4, as well as its associated centring hole 38 made in the drilling grid 34 concerned. In this respect, it is stated that each clip 70 could be fixed directly following the drilling of its associated hole, and therefore prior to drilling of the next hole, without going outside the context of the invention. Furthermore, each hole drilled does not require a clip 70 to be housed in it, as is also shown in FIG. 11.

Figure 12:
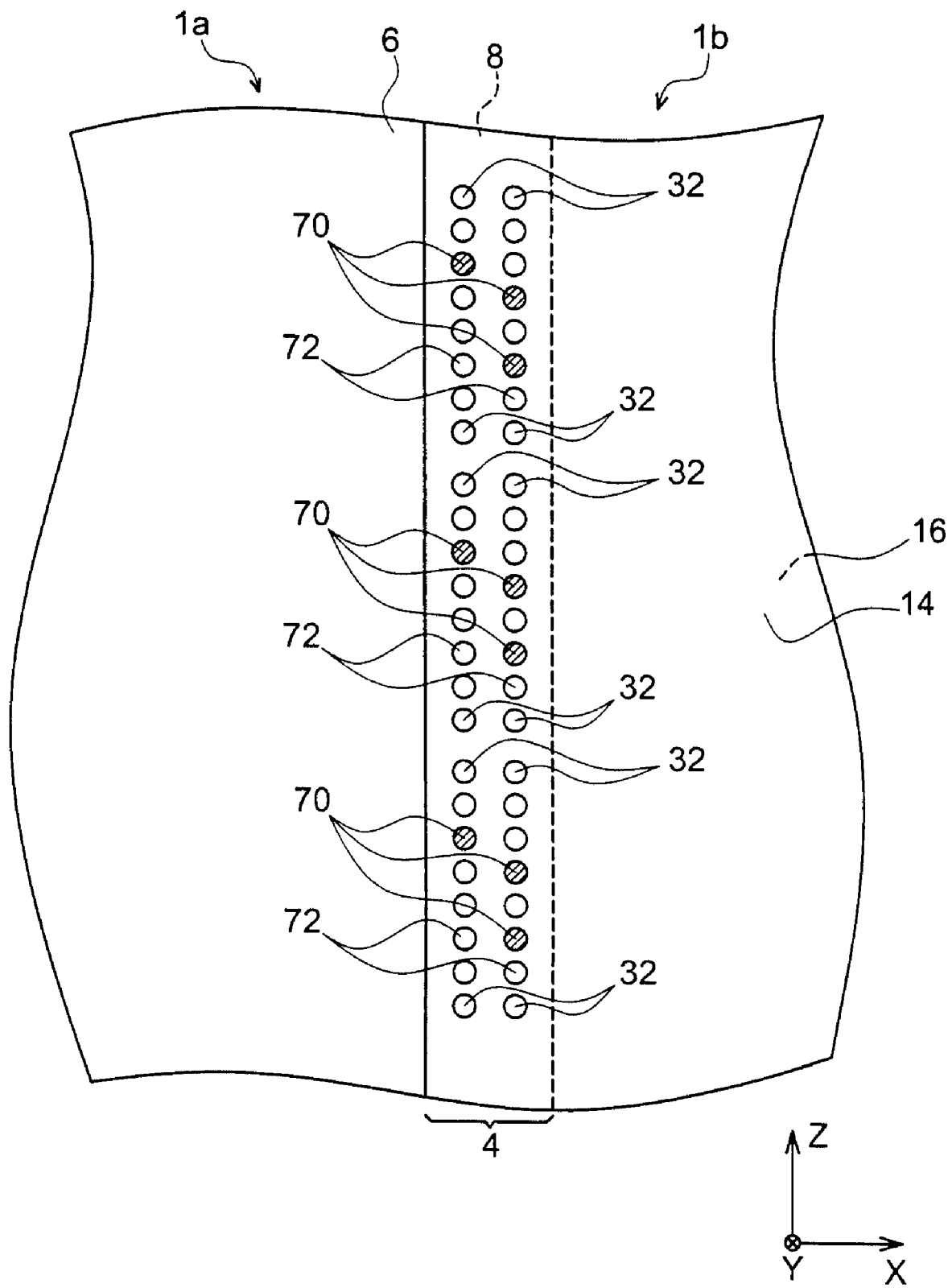

Then each drilling grid 34 and temporary fastening component 36 is removed. As may be seen in FIG. 12, this then only reveals the assembly holes 32, holes 72 designed to house the fastening components, and the fastening components 70 on the outside of the fuselage.

When each second device for applying pressure 12 has also been removed, the fastening components 74 are also put in place in their respective holes 72, where this putting in place is of course achieved whilst maintaining the set relative positioning of the two assemblies 1a, 1b achieved during the reference positioning step. This step, involving the production of the seam of rivets, is carried out in a conventional manner familiar to those working in the field, preferably only from the outside 14 of the fuselage.

Figure 13:
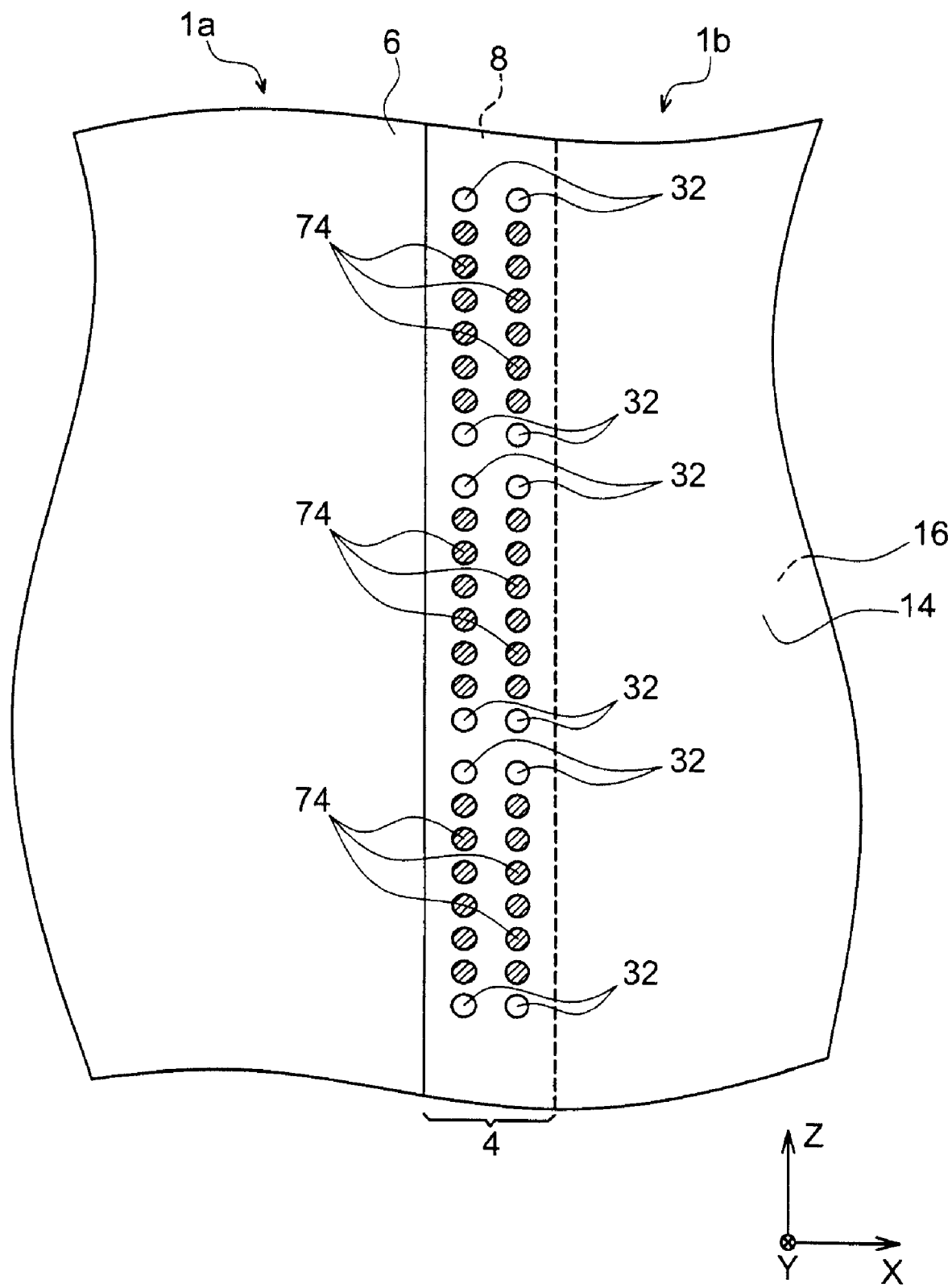
Figure 14:
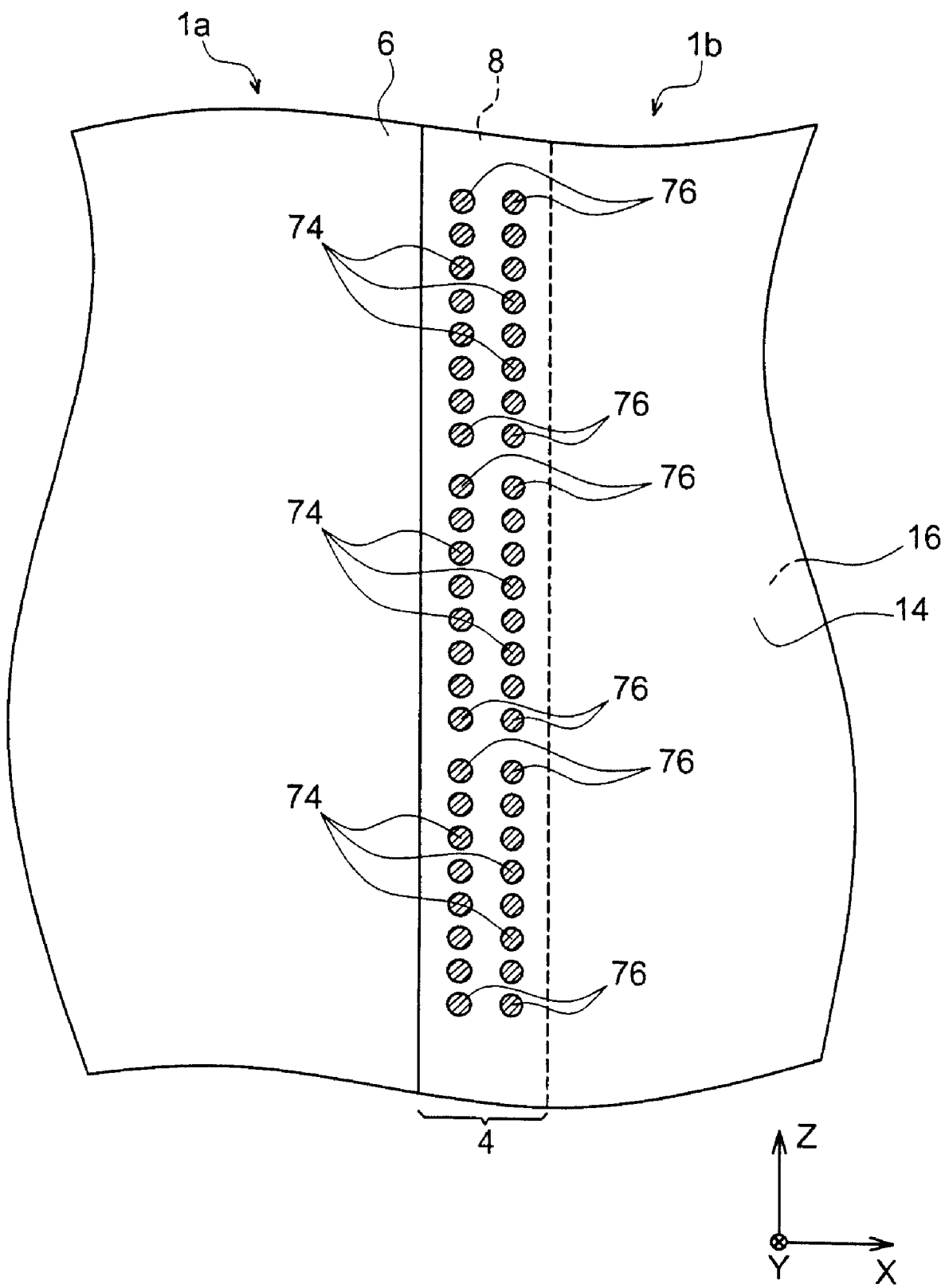

At this stage, only the assembly holes 32 remain free on the overlap zone 4, as shown in FIG. 13. This means that the fitting in place of supplementary fastening components 76, such as rivets, is carried out in these same assembly holes 32, as can be seen in FIG. 14. More specifically, after the fastening components 74 are put in place, the so-called assembly holes 32, in which the clips 36 were placed for supporting the grids 34, may be drilled to their final diameter, countersunk and associated supplementary fastening components 76 placed in these same holes. The interface pressure provided by the prior fitting and tightening of all other fastening components 74 means that this drilling and countersinking can be carried out by conventional means, without the use of additional pressure means.

Naturally, various modifications can be made by those working in this field to the invention that has just been described as a non-restrictive example only.

The invention claimed is:

1. A process for assembling two assemblies by multiple fastening devices configured to create a junction between two panels which are at least partly superimposed and which belong respectively to the two assemblies and which together form an overlap zone, the process comprising:
    drilling of multiple holes through the overlap zone, wherein each of the holes is configured to house one of a plurality of fastening components, the drilling of each hole is achieved using a drilling tool which passes through an associated centering hole made in a drilling grid securely fixed onto the overlap zone, the drilling tool includes a mandrel for support on the overlap zone and an expanding ring fitting over a conical contact surface of said mandrel, said expanding ring being configured to expand upon a relative movement between the mandrel and the expanding ring and further configured to immobilize in the associated centering hole;
    wherein application of the relative movement between the expanding ring and the mandrel is achieved so that, following immobilization of the expanding ring in the associated centering hole, the mandrel is displaced through the associated centering hole and along a central axis of the conical contact surface in the direction of said overlap zone, to exert a pressure on the overlap zone.

2. A process according to claim 1, wherein the application of the relative movement between the expanding ring and the support mandrel is achieved to cause a displacement of the mandrel supported against the overlap zone and through the associated centering hole over a distance (x2) which meets the condition (x2)>0.90.(x), where (x) corresponds to a total distance for the relative movement applied between the ring and the mandrel.

3. A process according to claim 1, wherein the application of the relative movement between the expanding ring and the support mandrel is achieved to produce, at the end of the application, a pressure of the support mandrel on the overlap zone of between about 600 N and 1200 N.

4. A process according to claim 1, wherein the drilling grid is made of aluminum or one of its alloys, and the expanding ring is made of steel.

5. A process according to claim 1, wherein the drilling grid is configured so that before the application of the relative movement between the expanding ring and the support mandrel, when the drilling tool is positioned with its support mandrel through the associated centering hole and in contact with the overlap zone, the expansion ring emerges from either side of the associated centering ring.

6. A process according to claim 1, further comprising reference positioning of the two assemblies, to bring these two assemblies into a set relative position allowing drilling of the holes to be carried out.

7. A process according to claim 6, wherein drilling of the holes and a later putting the fastening components in place in their respective holes are carried out successively whilst maintaining the set relative positioning achieved during the reference positioning of the two assemblies.

8. A process according to claim 6, comprising successive operations, carried out whilst maintaining the set relative positioning obtained during the reference positioning of the two assemblies of:
- fixing of one or more drilling grids onto the overlap zone, with each drilling grid being equipped with multiple centering holes;
- drilling the holes through the overlap zone, using a drilling tool configured to fit onto each drilling grid;
- removal of each drilling grid;
- fitting in place of the fastening components in their respective holes.

9. A process according to claim 1, comprising successive operations of:
- reference positioning of the two assemblies, configured to bring these two assemblies into the set relative positioning allowing drilling of the holes to be carried out, wherein the two assemblies, thus positioned, which together form the overlap zone, have a layer of interposition sealant between the two panels of this zone;
- putting in place one or more first devices for applying pressure onto a first side of the overlap zone and putting in place one or more second devices for applying pressure onto a second side of the overlap zone, opposite the first side;
- drilling assembly holes through the overlap zone, for fixing the drilling grid, with each hole being made close to at least one first device for applying pressure and to at least one second device for applying pressure;
- removal of each first device for applying pressure;
- fixing of one or more drilling grids onto the overlap zone, on its first side, using a temporary fixing which fits into the assembly holes;
- drilling the holes through the overlap zone, from the first side of the overlap zone using a drilling tool configured to fit onto each drilling grid, wherein each hole is made close to at least one second device for applying pressure;
- fitting in place temporary fastening components, wherein each passes through one of the holes made in the overlap zone, as well as its associated centering hole mode in the drilling grid;
- removal of each drilling grid and of the temporary fastening components;
- removal of each second device for applying pressure;
- putting the temporary fastening components in place in their respective holes, wherein the putting in place is achieved whilst maintaining the set relative positioning achieved during the reference positioning of the two assemblies; and
- fitting in place subsidiary fastening components in the assembly holes.

10. A process according to claim 1, comprising successive operations of:
- reference positioning beforehand the two assemblies, to bring these two assemblies into the set relative positioning, wherein the two assemblies, thus positioned, together form the overlap zone;
- drilling assembly holes through the overlap zone, for subsequent fixing of the drilling grid;
- reference positioning the two assemblies, which together form the overlap zone, have a layer of interposition sealant between the two panels of this zone;
- putting in place one or more second devices for applying pressure onto a second side of the overlap zone, opposite a first side;
- fixing one or more drilling grids onto the overlap zone, on said first side, using a temporary fixing which fits into the assembly holes;
- drilling holes through the overlap zone, from the first side of the overlap zone using a drilling tool configured to fit onto each drilling grid, wherein each hole is made close to at least one second device for applying pressure;
- fitting in place temporary fastening components, wherein each passes through one of the holes made in the overlap zone, as well as an associated centering hole made in the drilling grid;
- removal of each drilling grid and of the temporary fastening components;
- removal of each second device for applying pressure;
- putting the temporary fastening components in place in their respective holes, wherein this putting in place is achieved whilst maintaining the set relative positioning achieved during the reference positioning of the two assemblies; and
- fitting in place of subsidiary fastening components in the assembly holes.

11. A process according to claim 1, wherein the fastening components are rivets.

12. A process according to claim 1, applied to assembling aircraft fuselage assemblies.

13. A process according to claim 1, applied to assembling aircraft fuselage assemblies which exhibit a double curvature overlap.

14. A process according to claim 1, implemented such that the fastening components together form an orbital seam.

* * * * *